Oct. 12, 1926.

J. LEE 1,602,798

MOTOR DRIVEN HANDSAW

Filed August 6, 1924     3 Sheets-Sheet 1

WITNESSES
George Mueller
M. E. Downey

INVENTOR.
Joseph Lee
By K. S. Caldwell
ATTORNEY.

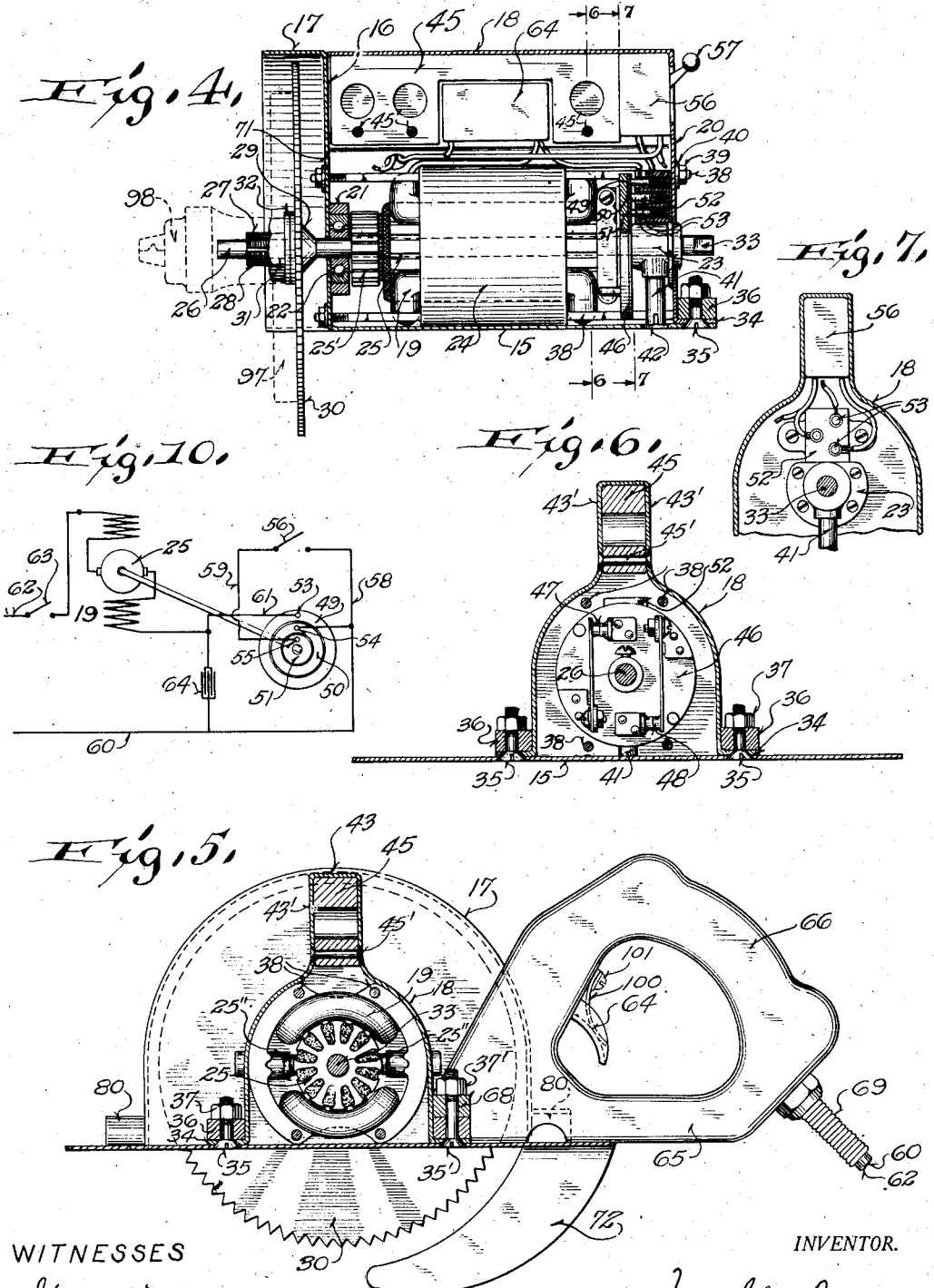

Oct. 12, 1926.

J. LEE

MOTOR DRIVEN HANDSAW

Filed August 6, 1924

WITNESSES

INVENTOR.
Joseph Lee
ATTORNEY.

Patented Oct. 12, 1926.

1,602,798

UNITED STATES PATENT OFFICE.

JOSEPH LEE, OF MILWAUKEE, WISCONSIN.

MOTOR-DRIVEN HANDSAW.

Application filed August 6, 1924. Serial No. 730,435.

The invention relates to improvements in motor-driven hand saws.

It is the general object of the invention to provide a motor-driven hand saw of novel and improved construction to the end of reducing its weight without sacrificing the power required for the uses to which it will be put, whereby it can be used as a substitute for the ordinary hand saw. I am aware that motor-driven hand saws have been heretofore suggested, but these have been unwieldy and cumbersome, and of complicated construction. As a consequence, they have not been found suitable for the ready manipulation required in a device of this character, when performing the same duties as the ordinary hand saw.

More particularly, it is an object of the invention to provide a hand saw incorporating in an appropriate frame, a suitable electric motor having a projecting armature shaft on which a circular saw is mounted for direct drive, thus eliminating reduction gearing and other parts which would add considerably to the weight and cost of the machine. It will be understood that the circular saw must radially overhang the motor and the supporting frame in order to be useful for general work, and this has been heretofore accomplished by providing a reduction gearing giving the saw the necessary radial exposure beyond the frame, in addition to its provision for power requirements to avoid the additional weight of a larger motor, which would be out of the question for hand saw use.

It is another object to provide the saw with a motor of a construction whereby ample power is made available in a structure of comparatively small dimensions and correspondingly light weight, and by which more than one operating speed is obtainable for use with various tools without materially sacrificing power. The motor construction in general is disclosed in the copending application of Royal Lee, Serial No. 664,926.

A further object of the invention is to provide a motor-driven hand saw having a motor housing of improved construction, which is cut away at the lower side of the motor and secured to a base plate enclosing the motor at this point, thus effecting a reduction in weight, and shortening the distance from the armature shaft to the base plate, which makes possible ample saw exposure with a direct-connected saw of small dimensions.

Another object is to so construct the motor housing as to afford a grip for mounting in a vise when inverted, the device then serving as a bench saw and the base plate forming a saw table.

A further object is to provide a motor-driven saw which can be readily manipulated by one hand by means of a suitably disposed handle which can be placed on either side of the saw, thus accommodating right and left hand operators, and facilitating special work.

A further object is to provide a saw housing structure so associated with the motor structure that ample motor ventilation is obtained without the use of a special cooling fan.

A further object of the invention is to provide a motor-driven saw suitable for miter cutting and grooving, and having an adjustable guide for facilitating accurate work.

The invention further consists in the several features hereinafter set forth and more particularly defined by claims at the conclusion hereof.

In the accompanying drawings: Fig. 1 is a plan view of a device embodying the invention;

Fig. 4 is a longitudinal sectional view of the device;

Fig. 5 is a transverse sectional view taken on the line 5—5 of Fig. 1;

Fig. 6 is a transverse sectional view taken on the line 6—6 of Fig 4;

Fig. 7 is a transverse sectional view taken on the line 7—7 of Fig. 4;

Fig. 10 is a schematic wiring diagram of the device.

Figure 1:
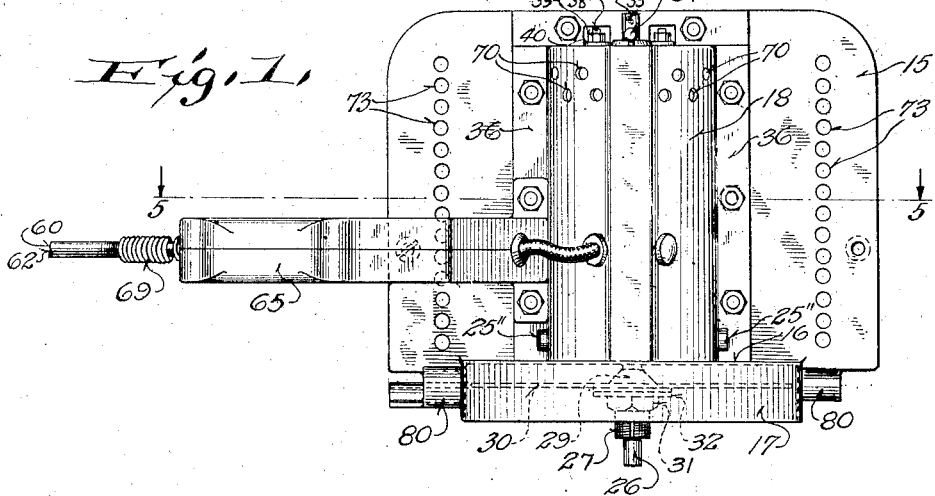
Figure 2:
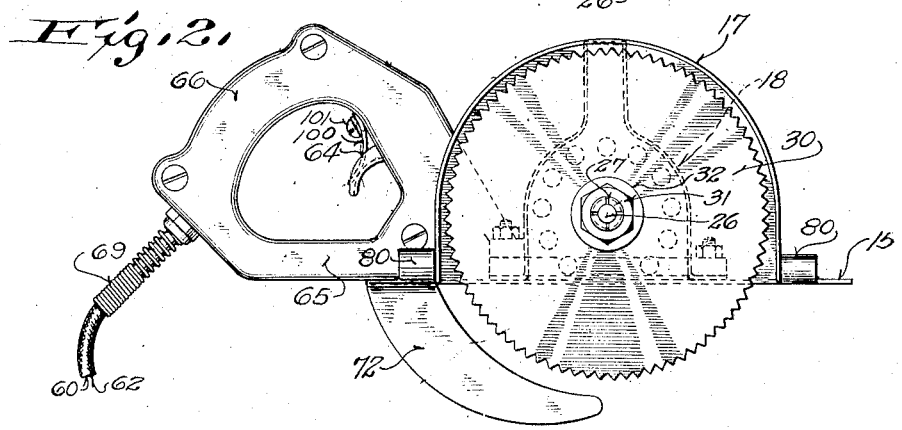
Fig. 2 is a side elevation of the device of Fig. 1.

In these drawings 15 indicates a base plate, preferably of sheet metal, which is turned up at right angles at one end to form part of a substantially semi-circular saw housing 16, the latter being provided with a curved flange 17 at its periphery. A motor housing 18, also preferably of sheet metal, cooperates with the base plate 15 to form an enclosure for the motor 19 and is provided with an end wall 20, the other end of the housing being open and abutting against the wall of the saw housing 16 to enclose this end.

The wall of the saw housing 16 is provided with a ring 21 welded or otherwise secured thereto to receive a ball bearing 22, and the end wall 20 of the motor housing is provided with a flanged bearing member 23 disposed mainly within the housing and aligned with the ball bearing 22. The motor 19 includes the usual field frame 24 and armature 25, the shaft 26 of which is journalled in the bearings 22 and 23 and projects therefrom at each end. The end projecting into the saw housing is provided with a saw arbor 27 which is longitudinally slotted in a threaded portion 28 and has a conical end 29 forming a shoulder to receive a circular saw 30, which is held on the arbor by a nut 31, suitable washers 32 being interposed between the saw and the nut. When the nut is threaded onto the arbor it presses the slotted portions of the arbor inwardly to clamp the arbor on the armature shaft. The other end of the armature shaft is provided with flats 33 by which it may be held against rotation while the saw is being mounted on the arbor or removed therefrom.

The field frame 24 of the motor is of the usual laminated construction and is of general circular cross section with depressions at diametrically opposite portions where the poles are disposed. Since it is desirable to bring the base plate 15 as close as possible to the armature shaft in order to afford ample exposure of a small direct-connected circular saw, the base plate is utilized as part of the motor enclosure and bears directly against the field frame, preferably at the depressions therein. The motor housing 18 fits closely about the upper portions of the field frame but preferably extends down to the base plate at right angles thereto and is provided with flanges 34 bearing against the base plate and secured thereto by machine screws 35 which have their heads countersunk in the base plate and extend upwardly through the flanges 34 and through reinforcing strips 36 resting on the flanges. Nuts 37 are threaded on the screws and bear on the reinforcing strips 36 to distribute the pressure evenly on the flanges 34. Studs 38 pass through the field frame for clamping together the laminated structure and have their ends extending through the wall of the saw housing and the end wall 20 of the motor housing, where they are provided with nuts 39 bearing on washers 40 to firmly clamp the field frame in place and secure the motor housing in close abutment with the saw housing. The bearing member 23 which is disposed within the end wall 20 of the motor housing may be conveniently lubricated by an oil cup 41 extending to the base plate 15 within the housing and made accessible by an opening 42 in the base plate.

Figure 3:
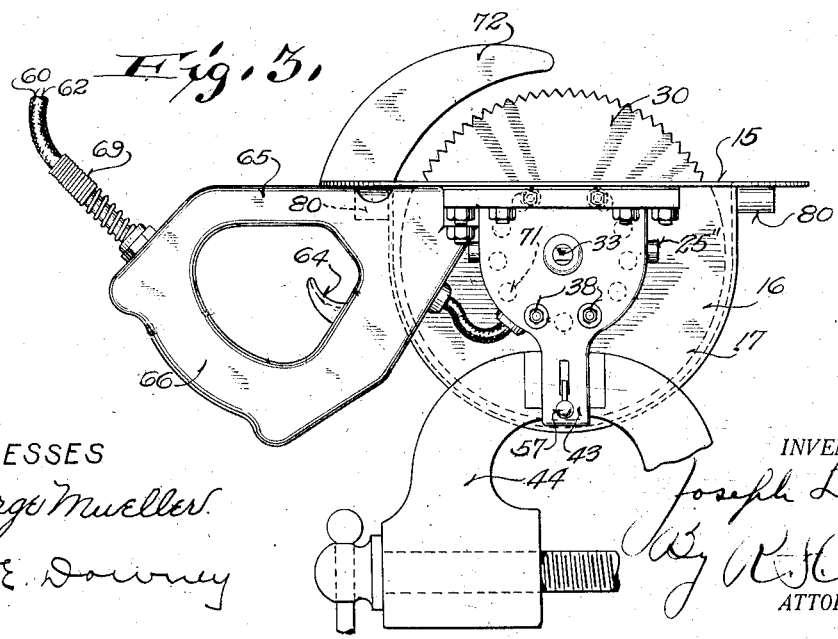
Fig. 3 is an elevation of the other side of the device, but showing it inverted and clamped in a vise for bench saw use.
Figure 9:
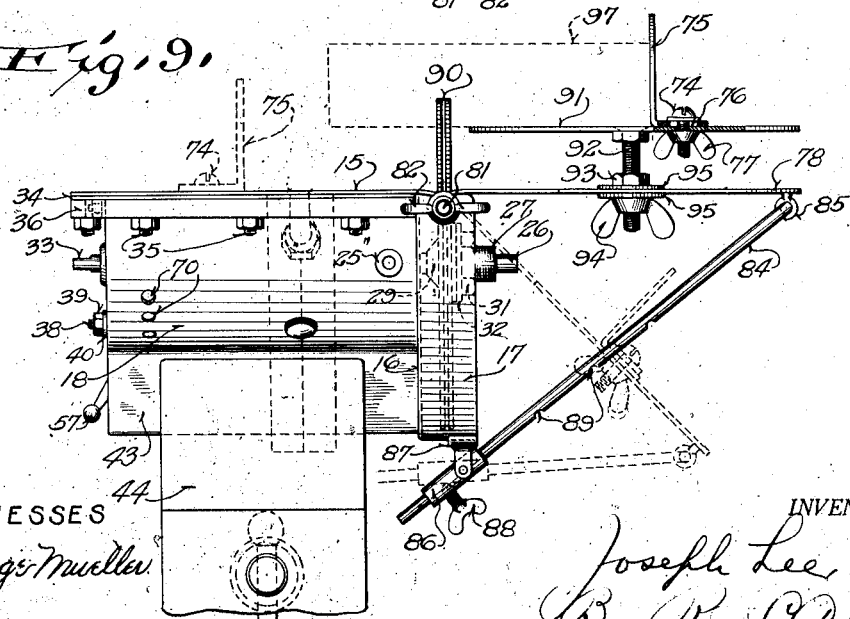
Fig. 9 is an end view of the device of Fig. 8, parts being broken away and parts being shown in section.

The motor housing 18 is provided with a vise grip 43 formed by spaced parallel portions 43' of the sheet metal projecting above the motor and extending from the saw housing to the end wall 20. When inverted, the saw is adapted for bench saw use, the base plate 15 forming a horizontal saw table and the vise grip 43 adapted to be engaged by a vise 44, as seen in Figs. 3 and 9, for holding it rigidly in position. To reinforce the vise grip the space between the portions 43' of the motor housing is provided with a filler 45, which is preferably an apertured hard wood block held therein by rivets 45', which also serve to prevent spreading of the sheet metal.

The motor 19 is preferably of the series wound universal type with the armature and field frame of comparatively small diameter in order to shorten the distance between the armature shaft and the base plate for obtaining the desired saw exposure with a direct-connected saw of small diameter, as hereinbefore stated. As illustrative of applicant's device, the saw is preferably of six inches diameter and with the motor construction hereinafter described ample power is available for cutting to a depth of approximately two inches, which indicates an unusually small motor for the power developed.

The armature shaft carries the usual commutator 25', and the brush assemblies 25'' are mounted in the motor housing. The motor includes a governor which limits the armature speed by breaking the load circuit. This feature permits the motor to be wound to pass a current substantially increased over that usually allowed in a motor of the same size and type for operation at the same voltage, as the motor cannot run away, the current at no load and at loads up to the point the governing ceases being practically the same as that of the motor compared. The power of the motor is accordingly substantially increased without causing excessive heating, as the load conditions met with in applicant's device are of intermittent character.

The governor includes a disk 46 of insulating material secured to the armature shaft to rotate therewith within the motor housing. The disk is provided on one side with a pair of centrifugally-opened spring-returned circuit closers 47 and 48 adapted to open at different predetermined rotative speeds, and a series of concentric slip rings 49, 50 and 51 are mounted on the other side of the disk. The outer slip ring 49 has a common connection to the circuit closers 47 and 48 while the inner slip rings 50 and 51 have individual connection therewith. A brush holder 52 is mounted on the end wall 20 of the motor housing above the bearing 23 and carries brushes 53, 54 and 55 engaging the slip rings 49, 50 and 51, respectively. A switch 56 is disposed adjacent the end wall 20 within the vise grip and has its operating handle 57 projecting through a slot in the end wall. As shown in Fig. 10, the switch is connected by conductors 58 and 59 to the brushes 54 and 55 respectively. The conductor 58 is connected to one line conductor 60, and the brush 53 which has a common connection to the centrifugal switches is connected to the motor windings by a conductor 61, the other side of the motor windings being connected to a line conductor 62 through a switch 63 hereinafter described.

When the switch 56 is open the low speed centrifugal contact breaker 48 is the only one effective, and when the switch is closed it establishes connection with the high speed centrifugal contact breaker 47, which requires a greater centrifugal force for causing it to open and limit the speed. A condenser 64 may be used across the breakers to reduce sparking and is conveniently disposed within the vise grip of the motor housing.

A handle 65 is provided for single handed manipulation of the saw and is preferably of hollow construction for lightness. The handle includes a grip portion 66 and abuts against the base plate whereon it is secured by a screw 67 and has apertured ears 68 resting on the flange reinforcing strips 36 and secured to the motor housing and base plate by screws 35' and nuts 37', as seen in Fig. 5. A trigger switch 64 is disposed in the handle for convenient access when the device is in use, and the line conductors 60 and 62 are suitably protected from mechanical injury at the point of entry to the handle by a spring enclosure 69. The handle 65 is mounted on the device in a plane parallel to the circular saw and through the center of gravity of the structure so that the device may approach the work or be lifted therefrom without any tendency towards lateral tipping, which might cause the saw to bind and which would make single-handed placement of the device against the work somewhat difficult. The handle may be changed from right to left when desired for left hand operators or for use in facilitating special work.

The suction effect at the circular saw is utilized to produce efficient cooling of the motor and thereby obviate the necessity for a special cooling fan, which would require additional space and add weight. For this purpose the motor housing 18 is provided with air intake openings 70 at the governor end of the motor and outlet openings 71 in the wall of the saw housing at the other end of the motor. When the device is in operation the work covers the space between the inner face of the saw and the adjacent edge of the base plate so that the space between the saw and the wall of the saw housing is enclosed except at the periphery of the saw. A strong suction effect is then obtained when the saw rotates, which draws air through the motor to effectively cool it. Even when the work does not cover the opening between the saw and the adjacent edge of the base plate, sufficient air is drawn through the motor for cooling purposes.

The saw housing 16 protects the operator from flying splinters and wood particles and an arcuate saw guard blade 72 is welded or otherwise secured to the base plate and disposed adjacent the exposed edge of the saw.

Figure 8:
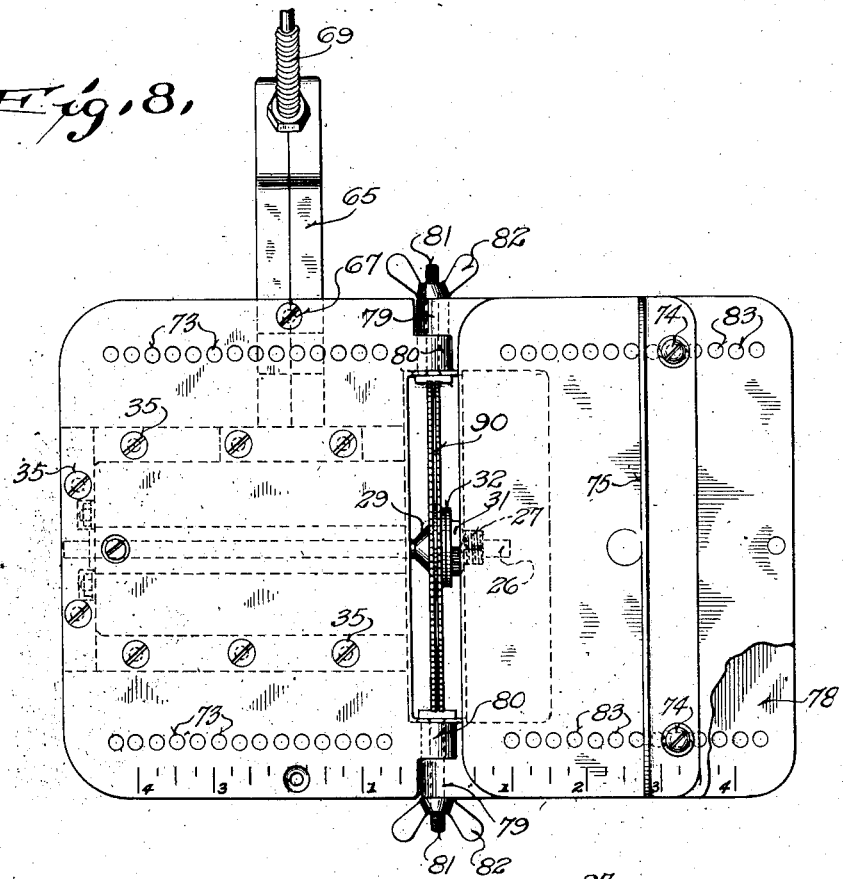
Fig. 8 is a plan view of the device when used as a bench saw, fittings being attached adapting it for grooving purposes.

The base plate 15 is provided with two series of equally spaced openings 73 disposed near opposite sides thereof and extending at right angles to the plane of the saw to receive the clamping screws 74 of a gauge member 75, the gauge member being of angle cross section and having slots 76 in its base flange to receive the clamping screws while permitting lateral adjustment, the screw being provided with thumb nuts 77. Suitable indicia may be placed on the saw table, as shown in Fig. 8, for facilitating the placement of the gauge member at the desired distance from the saw. The gauge member may be used both for hand saw and bench saw operations and permits accurate cutting of the work.

For miter cutting and for work requiring additional support, an extension table 78 is pivotally secured to the base plate by providing them with cooperating hollow hinge lugs 79 and 80, respectively, turned up from the sheet metal and preferably disposed in the plane of the saw. Bolts 81 pass through the lugs with their heads within the saw housing and are provided with thumb screws 82 by which the extension table can be clamped in any desired position. The extension table is provided with two series of equally spaced openings 83, similar to the openings 73 in the base plate 15, to receive clamping bolts of the gauge member 75, and may also be provided with the calibrating indicia. The table may be additionally supported at its outer end by a rod 84 pivoted on an eyebolt 85 disposed near the edge of the table, and extending to the saw housing where it may be suitably held, as by extending through a guide member 86 pivotally mounted on a bracket 87 secured to the saw housing, a thumb screw 88 being threaded in the guide member and adapted to enter spaced notches 89 in the guide rod for holding the table in any desired angular position.

In order to adapt the device for grooving work, the saw may be replaced by a dado head 90 or other suitable cutting member, and the work may be supported at the proper height above the saw table by a supplementary table 91 which is adjustable above the extension table by a bolt 92 rigidly secured thereto and having its threaded end extending through the extension plate on which it is firmly held by a nut 93 on the upper side and a thumb nut 94 on the other side, suitable washers 95 being interposed to afford a good bearing surface. The table 91 is also provided with openings by which it is adapted to receive the gauge member 75 by which the work 97 may be guided.

The circular saw may be replaced by a grinding wheel 97 indicated in dotted lines in Fig. 4, or by a chuck 98, by which a variety of rotating tools may be used, such as brushes and drills.

When the device is to be moved along the work for a cutting operation thereon, the work will ordinarily be clamped in a vise or placed on a bench and firmly held in position when it is of a portable nature. However, for operations on crates, concrete forms, and the like, no special disposition of the work is necessary. The device is of sufficiently light weight to be readily held in one hand by its handle, and the disposition of the handle in the center of gravity prevents any tendency towards undesired tilting in the manipulation of the device. The forward portions of the base plate are placed on the work so that the device will be largely or entirely supported by the work itself in the case of movement in a horizontal plane.

With the device thus supported, the operator will be able to guide it readily by means of his grasp on the grip portion 66 of the handle 65. The switch 56 is set by its handle 57 for the desired motor speed and the motor is started in operation by displacing the trigger of the trigger switch 64, thereby completing a circuit through the motor, which attains a speed determined by the active governor element. The circular saw is then urged into the work by sliding the base plate 15 thereover, the saw housing being open at its side in order to view the progress of the saw along the work. When conditions require, the gauge member 75 may be readily applied to the base plate for facilitating accurate cutting. When the sawing operation is complete the release of the trigger of the trigger switch permits the circular saw to come to rest.

The trigger is held in normally released position by a spring 100 bearing against it and secured to the handle by a removable screw 101. When the spring is removed by turning out the screw the switch remains in either "on" or "off" position when the trigger is displaced in opposite directions, which is desirable when the saw is held stationary for bench saw service.

For bench saw use the vise grip 43 of the device permits it to be readily held in a vise when inverted, with the base plate horizontally disposed and serving as a saw table. The pivoted extension table 78 and the supplementary table 91 permit a great variety of work to be accommodated with the assistance of the gauge member.

It is to be noted particularly from reference to Figure 3, that when the device is inverted, as shown in such figure, that the portion of the handle normally occupying the highest position is in substantial alignment with the rib 43, consequently the device may be rested on a table top with the rib providing an extensive contact with such table top and with the handle contacting with the table top at a point spaced from the rib. This gives the equivalent of a three point bearing and provides a secure support for the device.

The construction of the motor-driven hand saw herein described is simple and compact, and makes for comparatively light weight, which is essential for utility in a device of this character.

What I claim as new and desire to secure by Letters Patent is:—

1. In a motor-driven hand saw, the combination of a base plate, a motor having a projecting armature shaft, a circular saw mounted on said armature shaft and projecting radially beyond the base plate, a housing for said saw, a housing for said motor secured to said base plate and to said saw housing and having a parallel sided longitudinally extending rib normal to said base plate and at the opposite side of the motor to form a vise grip, said rib extending at right angles to said saw housing, whereby the device when inverted may be held in a vise and form a bench saw with said base plate serving as a saw table.

2. In a motor driven hand saw, the combination of a work engaging sheet metal base plate, a motor having a projecting armature shaft, a circular saw mounted upon said armature shaft and projecting radially from said base plate, a sheet metal housing for said motor having an open side provided with flanges abutting against said base plate and secured thereto and having an open end, said sheet metal base plate having an integral, upwardly extending portion closing said open end to form one wall of a guard for said saw and the end of the motor housing, whereby said base plate forms part of the motor enclosure to increase the radial exposure of the saw beyond said base plate.

3. In a motor driven hand saw, the combination of a sheet metal base plate, a motor having a projecting armature shaft, a circular saw mounted on said shaft and projecting radially beyond said base plate, said base plate having an upwardly extending portion flanged to form a saw guard, a sheet metal housing for said motor having an open side and having marginal flanges at such side secured to said base plate, said housing being secured to said saw guard, said housing having a longitudinally extending hollow rib, and a filler positioned within said rib.

In testimony whereof, I affix my signature.

JOSEPH LEE.